(12) United States Patent
Chung et al.

(10) Patent No.: US 7,445,754 B2
(45) Date of Patent: Nov. 4, 2008

(54) DEVICE FOR CONTROLLING FLUID USING SURFACE TENSION

(75) Inventors: Kwang Hyo Chung, Busan-shi (KR);
Jong Soo Ko, Daejon-shi (KR); Hyun Chul Yoon, Seoul (KR); Hae Sik Yang, Daejon-shi (KR); Hyeon Bong Pyo, Daejon-shi (KR); Sung Jin Kim, Daejon-shi (KR); Yun Tae Kim, Daejon-shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 352 days.

(21) Appl. No.: 10/671,490

(22) Filed: Sep. 29, 2003

(65) Prior Publication Data

US 2004/0091399 A1    May 13, 2004

(30) Foreign Application Priority Data

Nov. 11, 2002    (KR) .................. 10-2002-0069636

(51) Int. Cl.
*B01L 3/02* (2006.01)
(52) U.S. Cl. .................. 422/100; 422/99; 436/180; 137/806
(58) Field of Classification Search ........... 422/99–101; 436/180; 137/806
See application file for complete search history.

(56) References Cited

U.S. PATENT DOCUMENTS

| 4,756,884 A | 7/1988 | Hillman et al. |
|---|---|---|
| 5,087,556 A | 2/1992 | Ertinghausen |
| 6,113,855 A | 9/2000 | Buechler |
| 6,143,248 A | 11/2000 | Kellog et al. |
| 6,271,040 B1 * | 8/2001 | Buechler .................. 436/170 |
| 6,296,020 B1 * | 10/2001 | McNeely et al. ............ 137/806 |
| 2001/0001060 A1 * | 5/2001 | Kellogg et al. ............... 435/7.1 |
| 2002/0086436 A1 | 7/2002 | Buechler |

FOREIGN PATENT DOCUMENTS

KR    1020020032369    5/2002

OTHER PUBLICATIONS

Phillip G. Wapner, et al.; "Utilization of surface tension and wettability in the design and operation of microsensors"; Sensors and Actuators B 71 (2000); pp. 60-67.
Man et al.; "Microfabricating Capillarity-Driven Stop Valve and Sample Injector"; IEEE; 1998; pp. 45-50.

* cited by examiner

*Primary Examiner*—Jill Warden
*Assistant Examiner*—Jyoti Nagpaul
(74) *Attorney, Agent, or Firm*—Lowe Hauptman Ham & Berner, LLP

(57) ABSTRACT

Disclosed is to a device for exchanging minimum amount of the fluid only by using surface tension of the fluid instead of external force like a pump. According to the device, an additional pump and power supply is not needed, thereby the device can be small sized and portable, and not only manufacturing cost decreases and yield increases but the device is hardly out of order.

16 Claims, 4 Drawing Sheets

DEVICE FOR CONTROLLING FLUID USING SURFACE TENSION

BACKGROUND OF THE INVENTION

1. Field of the Invention

The present invention relates to a device for controlling micro fluid, in particular, relates to the device for exchanging minimum amount of the fluid only by using surface tension of the fluid instead of external force like a pump.

2. Description of the Prior Art

The microfluidic control implies doing various handlings, such as the feeding, stopping, exchanging, or mixing of the microfluids in very small channels or chambers. The microfluidic devices, in which such microfluidic controls are accomplished in a single chip, are called LOC(Lap-On-a-Chip), and they perform specific functions like biochemical reaction, mixing, or detection, etc., by controlling the micro fluid. Examples of the microfluidic device include various bio chips such as a protein chip, a DNA chip, a drug delivery system, and a micro biological/chemical reactor.

The microfluidic control is achieved by various operating principles. For example, the microactuating method by which a micro pump and valve are mounted on a channel or chamber, the electrophoretic/electroosmatic method by which a voltage is applied along a fine channel to move the fluid, or the capillary flow method using capillary force are possible. The devices for controlling the micro fluid are classified into the active and passive microfluidic components. The active fluid control is achieved by the active microfluidic components such as a micro pump or valve driven by electricity and external mechanical forces. However, the passive microfluidic components use natural forces and the fluid control in those components is achieved by surface modifications or geometrical variation of channels or chambers.

The device which uses the capillary force as a driving force is a passive element. It stops and feeds the fluid, and even adjusts the flow speed, according to the principle that attractive and repulsive forces are naturally produced by the surface tension between the fluid and inner surfaces of the fine connecting channel. It is because of the property of the surface tension that the surface tension is used for a micro fluid control. In other words, as a ratio of the surface area to a volume becomes high in a very small sized fluid system, a force associated with the surface, especially the surface tension produced when a free surface is formed on the fluid, can play a relatively much greater role than that of other forces. Also, the fluid control using surface tension has several advantages. For example, there exists no driving elements, thereby additional power supply is not needed, and when it is applied to a biochip, not only a instrument thereof can be small sized but manufacturing and operating costs of the instrument can be reduced and the instrument is hardly out of order.

Because of the characteristics and advantages of the fluid control using the surface tension as described above, the principle of the surface tension is applied to many micro fluid control systems. For example, the systems include a micro stop valve, a micro pressure sensor, an micro-accelerometer, a micropump, fluid feeding, fluid filling, an inkjet, a robot probe, a MOEMS equipment, an optical shutter, a micro switch, etc.

However, the fluid control only using the surface tension has disadvantages. For example, the fluid control is sensitive to geometry and surface condition, and since it has no external force, it is difficult to exactly control time and flow control. Especially, as the surface tension occurs on the interface between liquid and gas, additional force can not be applied to the liquid portion already filled, thereby the control has some limitations. Therefore, most devices using the conventional surface tension utilize the surface tension only as a driving force for feeding the fluid or as a means for stopping the fluid. Further, a device has been complemented by coupling with an active type device such as a pump.

Typical examples of a device for controlling fluid using capillary flow are as follows. See the following publications which are incorporated herein by reference: U.S. Pat. No. 6,143,248 entitled "capillary micro valve" issued Nov. 7, 2000; U.S. Pat. No. 6,271,040 B1 entitled "diagnostic devices method and apparatus for the controlled movement of reagents without membranes" issued Aug. 7, 2001; U.S. Pat. No. 6,296,0020 B1 entitled "fluid circuit components based upon passive fluid dynamics" issued Oct. 2, 2001; and U.S. Pat. No. 6,113,855 entitled "devices comprising multiple capillarity inducing surfaces" issued Sep. 5, 2000.

The U.S. Pat. No. 6,143,248 entitled "capillary micro valve" has disclosed the micro valve for feeding micro fluid from a micro storage chamber to a transferring channel by means of the adjustment of channel size and centrifugal force based on the principle of capillary and centrifugal force. The U.S. Pat. No. 6,271,040 B1 entitled "diagnostic devices method and apparatus for the controlled movement of reagents without membranes" has disclosed a diagnostic biochip structure, in which the samples are fed only using the capillarirty and react in chambers and connecting channels, fordetermining the existence of sample reaction in optical means. The U.S. Pat. No. 6,296,0020 B1 entitled "fluid circuit components based upon passive fluid dynamics" has disclosed a structure capable of stopping the fluid using the hydrophobic material or the abrupt expansion of connecting channel within the capillary tube. The U.S. Pat. No. 6,113,855 entitled "devices comprising multiple capillarity inducing surfaces" has disclosed a technical idea that produces capillary force by suitably arranging hexagonal micro columns in chambers.

However, the above referenced patents use the surface tension only as a simple passive means for driving the fluid or a means for stopping the fluid by controlling the capillary force based on a geometrical change of the connecting channel or a surface modification.

SUMMARY OF THE INVENTION

Therefore, the object of the present invention is to provide a device for controlling fluid using surface tension, which can not only feed and stop the micro fluid and adjust a speed of the micro fluid but also completely exchange the fluid within chambers only using a natural flow based on the surface tension. And this device has been invented in order to realize the fluid control by a passive device only using the surface tension, which had been realized only by an active device.

To achieve the above object, the device for controlling fluid using surface tension in accordance with the present invention comprises, at least one storage chamber to which a fluid is injected and stored, at least one reaction chamber in which a predetermined reaction is occurred to the reagent, at least one exhaust chamber in which the used fluid is exhausted, at least one connecting channel which connects the storage chamber, reaction chamber and exhaust chamber so that the fluid is transferred, at least one flow delay part which is formed within the connecting channel and retards flow of the fluid by the treatment of the fluid's surface tension, and at least one stop valve which is formed within the connecting channel and stops the flow of the fluid by the surface tension, it is preferable that the fluid moves from the storage chamber to the reaction chamber and exhaust chamber by means of the surface tension.

The device according to the present invention fills the reaction chamber with fluid by the surface tension and, after a predetermined time elapses, exchanges the fluid within the reaction chamber with a different kind of fluid. An external mechanical equipment such as a pump is not used, and the fluid is stopped, fed, or time delayed by the control of the surface tension for fluid exchange. This device using the surface tension can be applied to various bio elements including protein chip, a DNA chip, a drug delivery system, and a micro biological/chemical reactor by exchanging the fluid within the reaction chamber with a different kind of fluid. In particular, in the detection method, this device can be directly applied to a cleaning step performed in a bio chip using electrochemical detection method. Also, the present invention itself can be used for performing fluid control, and can perform more functions by adding conventional active elements.

The device for controlling the fluid in accordance with the present invention comprises storage chambers, reaction chambers, flow delay parts, stop valves, fluid channels, and exhaust chambers. The storage chamber includes a fluid inlet, and the exhaust chamber preferably includes a fluid outlet. Each of different fluids is stored in individual storage chambers through the fluid inlet, and the fluid moves to the reaction chamber through the fluidchannel, and fluid stored in the reaction chamber is exchanged with a different kind of fluid after a predetermined time. All this procedures are performed by natural flow based on the capillary force.

Hereinafter, embodiments of the present invention will be explained with reference to the accompanying drawings. Although the present invention has been described in conjunction with the preferred embodiment, the present invention is not limited to the embodiments, and it will be apparent to those skilled in the art that the present invention can be modified in variation within the scope of the invention.

DESCRIPTION OF THE PREPERRED EMBODIMENTS

Figure 1:
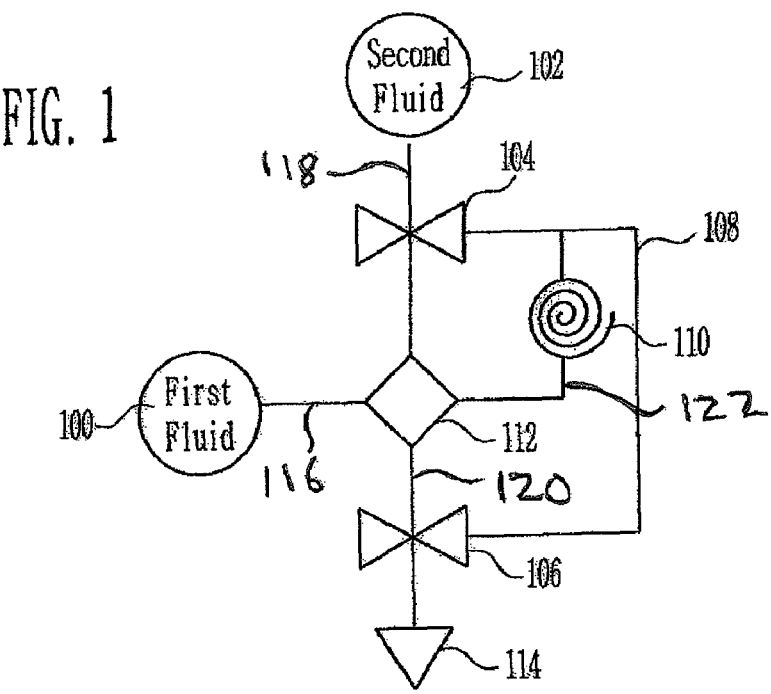
FIG. 1 shows a preferred embodiment of the fluid control device using surface tension according to the present invention.

FIG. 1 shows a preferred embodiment of the device for controlling fluid using surface tension. In this Figure, the device for controlling fluid using surface tension comprises a first storage chamber 100, a second storage chamber 102, a reaction chamber 112, a flow delay part 110, a first stop valve 104, a second stop valve 106, a connecting channel 108, and an exhaust chamber 114. Each element of the device is indicated by numerical references, and can take any shapes, and can be placed on a plane or in a space.

Referring to FIG. 1, the first and second fluids are injected and stored in the first and second storage chambers, respectively. The first fluid is moved to the reaction chamber 112 via connecting channel 116 using capillary force, and is stopped by the first and second stop valves 104, 106. The second fluid flows through connecting channel 118 and is also stopped at the first stop valve 104. The first and second stop valves are not ones of an active mechanical device, but ones implemented by the method which makes the fluid stopped by properly adjusting surface tension through the passive method such as geometrical change or surface modification of the channel. In other words, the first and second stop valves have the structure in which the fluid becomes naturally stopped through hydrophobic change of the surface caused by hydrophobic patch attachment or optical iffadiation and through geometrical change of a fluid channel such as fast increase of channel width or height. While the first fluid stops at the first and second stop valves 104, 106, it also flows along connecting channel 122 through the flow delay part 110 toward the first stop valve 104 and the side connecting channel 108, respectively. Here, the side connecting channel 108 is connected to the first and second stop valves and the flow delay part 110. The first fluid, which is flowing toward the first stop valve 104, is met with the first and second fluids which have been stopped by the surface tension at the first stop valve 104. At this time, the first and second fluids which have been stopped are met with the first fluid which is moving toward the first stop valve 104 and mixed, thereby the first stop valve cannot keep the first and second fluids stopped any more due to the cancellation of stopping barrier—so that they can move. Meanwhile, the first fluid moving through the side connecting channel 108 keeps moving toward the second stop valve 106. While the first fluid moves toward the side connecting channel 108, as described above, the first fluid which is moving toward the first stop valve 104 is met with the fluids which have been stopped at the first stop valve 104, thereby the function of the first stop valve becomes disabled, and then the mixed fluids as well as the first fluid which is moving toward the connecting channel 108 are moved together toward the side connecting channel 108 by a driving force derived from the surface tension. And the fluids moving through the side connecting channel 108 are met with the first fluid which has been stopped at the second stop valve 106, thereby the function of the second stop valve becomes disabled, as described in the function of the first stop valve, and then the mixed fluids flow toward the exhaust chamber 114 through exhaust channel 120. During this process, the second fluid stored in the second storage chamber 102 moves to the first stop valve 104, the reaction chamber 112, the second stop valve 106, and the exhaust chamber 114 in this order, so that the first fluid stayed in the reaction chamber at first time is exchanged with the second fluid. All the flow described above is performed only by the surface tension that occurs naturally.

The first chamber 100 and second chamber 102 may include fluid inlets or air gaps, and adjustment of surface tension through geometrical change, surface modification, and temperature change, and mounting of a structure can be applied to these chambers so that the smooth fluid flow by the surface tension is possible. The air gaps of the first chamber 100 and the second chamber 102 is kept open for preventing the fluid from stopped when a pressure occurs due to closed air gaps.

The reaction chamber 112 can be changed to various shapes in accordance with the applicable object. The reaction chamber can be any of channel, rhombus, and circle shape so that the fluid exchange is smoothly performed, and can be modified in accordance with the electrode arrangement if the electrode is needed for detection in a bio chip.

A method for stopping the flow by means of the surface tension can be applied to the first stop valve 104 and the second stop valve 106. For example, hydrophilic or hydrophobic properties by the surface modification of channel wall, change of channel shape, and change of the surface tension by temperature change, etc can be applied. The surface modification may be achieved using a method for chemical surface treatment by the hydrophilic and hydrophobic materials, an optical method for changing the hydrophilic property by irradiating the ultraviolet or x beams, and an electrical method. The change of channel shape can be achieved by extending or increasing the channel width or using both. The method using temperature change may be performed by applying temperature change to the position where the fluid will be stopped using heating and cooling means attached to the wall surface of the channel to change the surface tension of the fluid, resulting in changing the contact angle between liquid and solid, or delaying the flow speed.

The principle of reducing flow speed by the surface tension can be applied to the flow delay part 110. The methods described for the stop valve can be also applied to the flow delay part.

The exhaust chamber 114 can be any of a structure that has sufficient driving force in order to perform fluid exchange, and various shapes of the chamber can be used to have sufficient volume. For example, a shape which can be gradually increased or decreased, or a shape in which a certain structure is mounted will be possible. The structure mounted in the exhaust chamber 114 acts to increase the surface tension and keep the flow moving. Also, this structure can act to prevent fine air bubbles from occurring due to a local difference of the flow speed by making the general preceding shapes of the flowing fluid uniform. Various shapes of air vents can be added to the exhaust chamber in order to keep the fluid moving. These air vents are also added by the same reason as described in the storage chamber.

The flow path 108 can be of channel or tube shape, and the width or diameter of the flow path can be increased or decreased. Also, an isolation threshold can be added on the flow path in order to prevent the reactants among plurality of the reaction chambers 112 from diffusing while confining the chamber size.

A substrate, in which the constituents of the device for controlling the fluid will be formed, may include various polymers, such as PMMA(polymethylmethacrylate), PC(polycarbonate), COC(cycloolefin copolymer), PDMS (polydimethylsiloxane), PA(polyamide), PE(polyethylene), PP(polypropylene), PPE(polyphenylene ether), PS(polystyrene), POM(polyoxymethylene), PEEK(polyetheretherketone), PTFE(polytetrafluoroethylene), PVC(polyvinylchloride), PVDF(polyvinylidenefluiride), PBT (polybutyleneterephthalate), FEP(fluorinated ethylenepropylene), and PFA(perfluoralkoxyalkane), and heterogeneous or homogeneous materials such as silicon, glass, PCB(Printed Circuit Board), as well as various metals including aluminum, copper, steel can be also used. Such a substrate can be manufactured by the semiconductor processing method using deposition and etching or conventional machining method such as NC(Numerical Control) machining as well as hot embossing, injection molding, casting, stereolithography, laser ablation, rapid prototyping, silk screening , etc.

The device for controlling the fluid using surface tension in accordance with the present invention can be applied to a bio chip, a drug delivery system, and a biochemical reactor having various functions by varying the structure combination. Hereinafter, embodiment of the device for controlling the fluid subject to various structure changes will be explained.

Figure 2A:
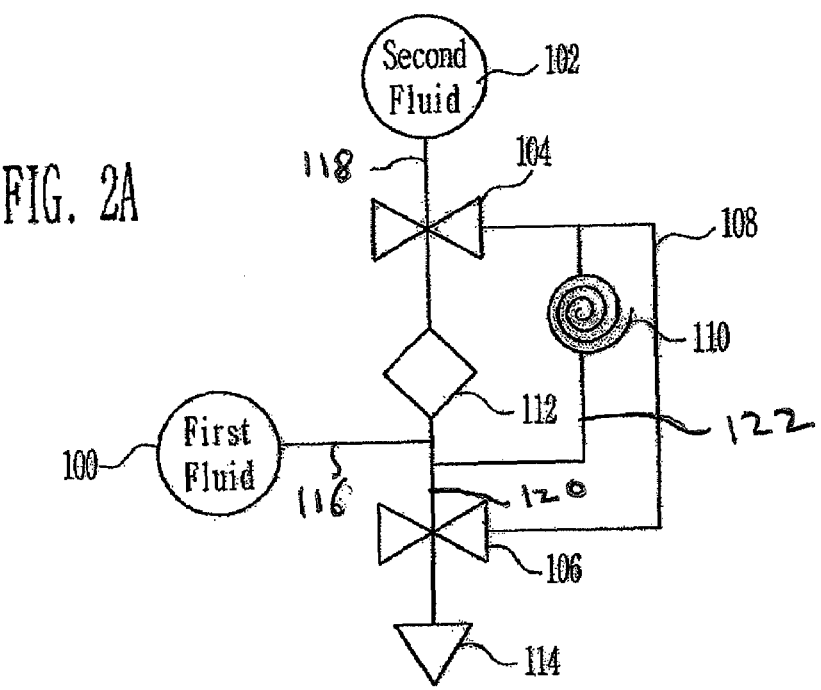
FIGS. 2A to 2C show other embodiments of the fluid control device using surface tension according to the present invention.
Figure 2B:
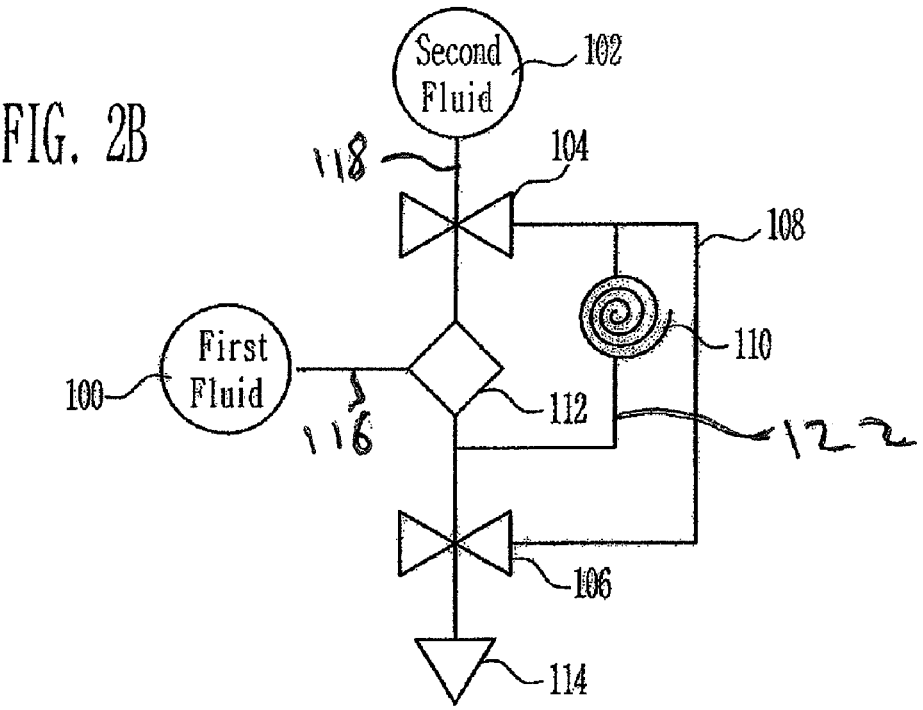
Figure 2C:
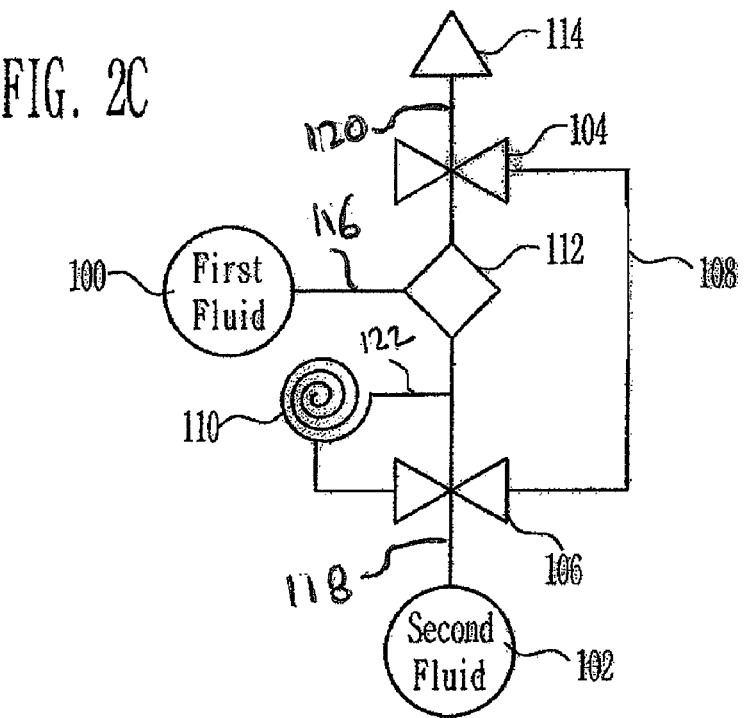

FIGS. 2A to 2C shows another embodiments of the device for controlling the fluid using the surface tension in accordance with the present invention.

The embodiment of FIG. 2A is different from that of FIG. 1 in that the channel 116, which had connected the first storage chamber 100 and the reaction chamber 112, and the channel 122, which had connected the flow delay part 110 and the reaction chamber 112, are shifted toward the second stop valve 106. The embodiment of FIG. 2B is different from that of FIG. 1 in that the channel 122, which had connected the flow delay part 110 and the reaction chamber 112, is shifted toward the second stop valve 106. The embodiment of FIG. 2C is different from that of FIG. 1 in that the flow delay part 110 is connected between the second stop valve 106 and the lower position of the reaction chamber 112. Such structure changes can be used to control the shape of the channel in accordance with the size of the reaction chamber and the applied reaction time.

Figure 3A:
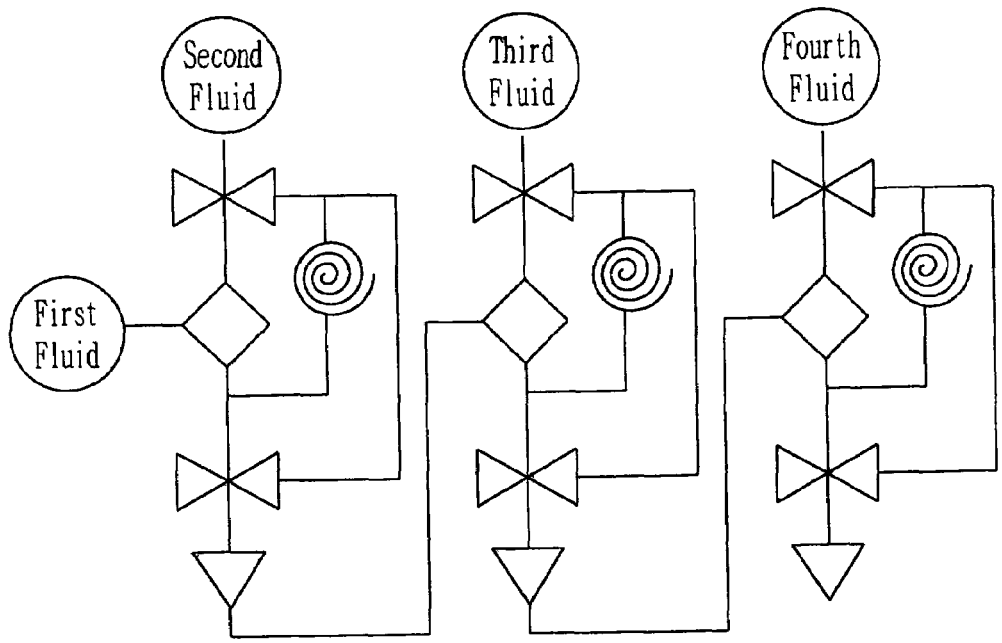
FIGS. 3A and 3B show serial and parallel type embodiments of the embodiment of FIG. 1.
Figure 3B:
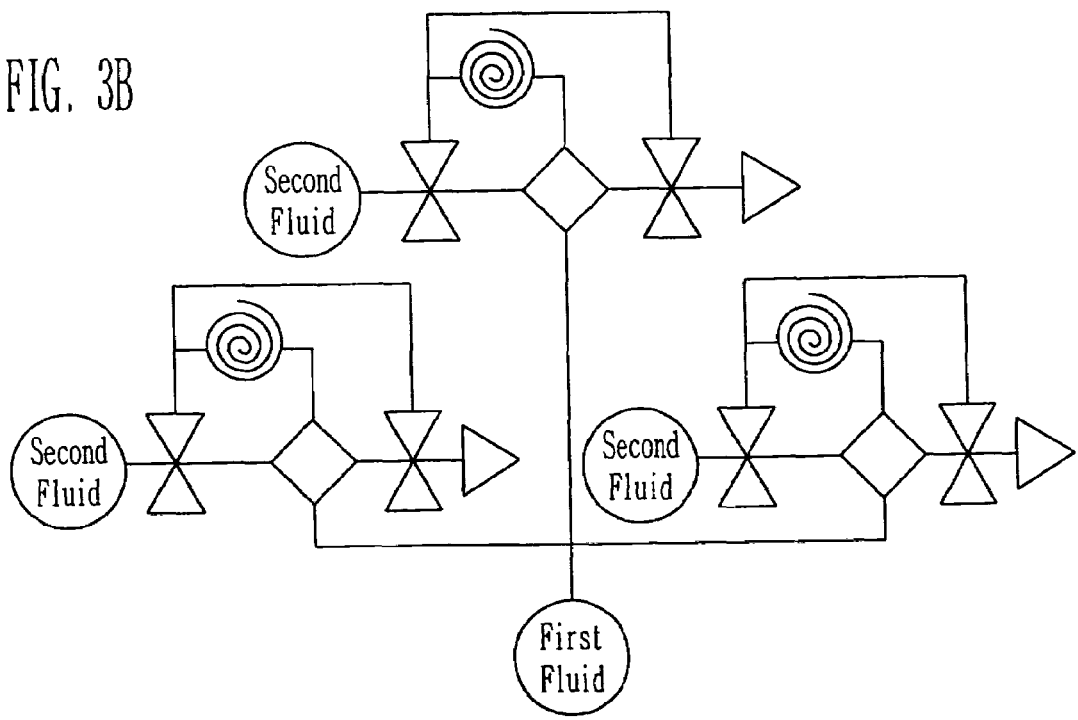

The principle of the present invention can be applied to biochemical reactors. It can be applied when reaction with time difference, etc is needed, and the amount of reactant in the reactors can be changed by adjusting the shape of the connecting channel. The structures shown in FIG. 1 can be modified to several serial and parallel extended ones thereby sequential or multiple reaction can be performed, and FIGS. 3a and 3b shows the serial and parallel embodiments, respectively. Also, the principle of the present invention can be applied to the drug delivery system. For example, adjustment of flow time at the flow delay part, sequential drug delivery, delivery after mixing, and delivery after a predetermined time or a delivery of predetermined amount of drug using serial and parallel structures, as shown in FIGS. 3a and 3b, is possible.

Figure 4:
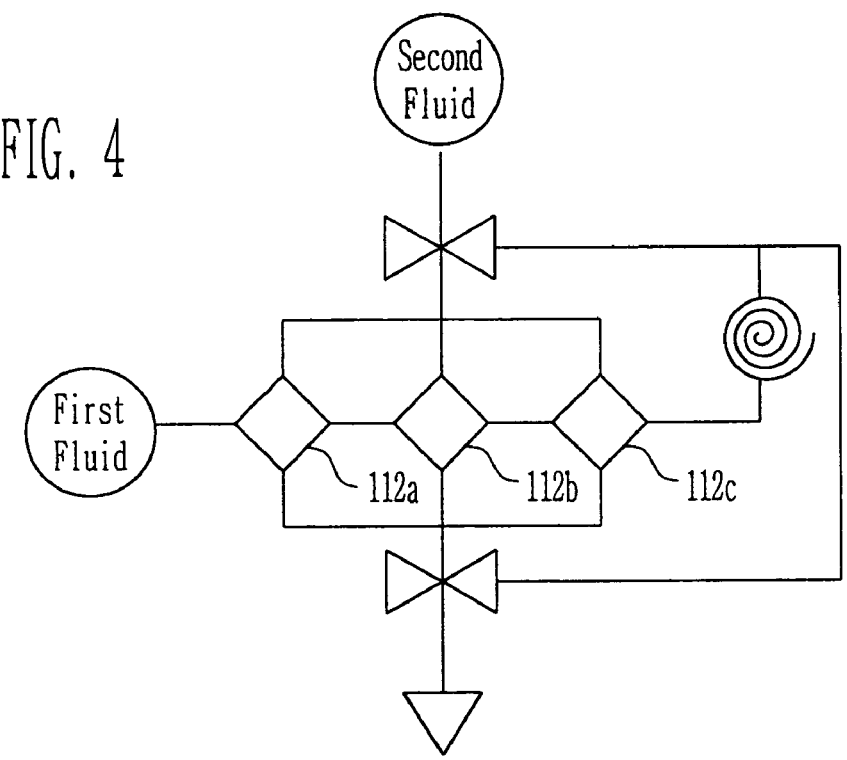
FIG. 4 shows another embodiment of a structure in which multiple reaction chambers of fluid control device using surface tension are arranged according to the present invention.

The present invention can be applied to bio chips using biochemical detection method. For example, optical detection method and electrochemical detection method is possible. In the electrochemical detection method, electrodes are formed on the chamber wall so that the various biochemical materials such as DNA or proteins including antigen and antibody can be fixed in accordance with the detection object on the electrodes, surface treatment such as self assembled mololayer can be made, or if needed, various chemical materials including surfactants can be formed in advance. Also, various detections can be performed at the same time by arranging multiple electrodes, which is shown in FIG. 4 that has arranged the multiple reaction chambers 112a, 112b, 112c of the device for controlling the fluid in accordance with the present invention.

Hereinafter, embodiments of the present invention will be explained with reference to the accompanying drawings. Although the present invention has been described in conjunction with the preferred embodiment, the present invention is not limited to the embodiments, and it will be apparent to those skilled in the art that the present invention can be modified in variation within the scope of the invention.

Figure 5:
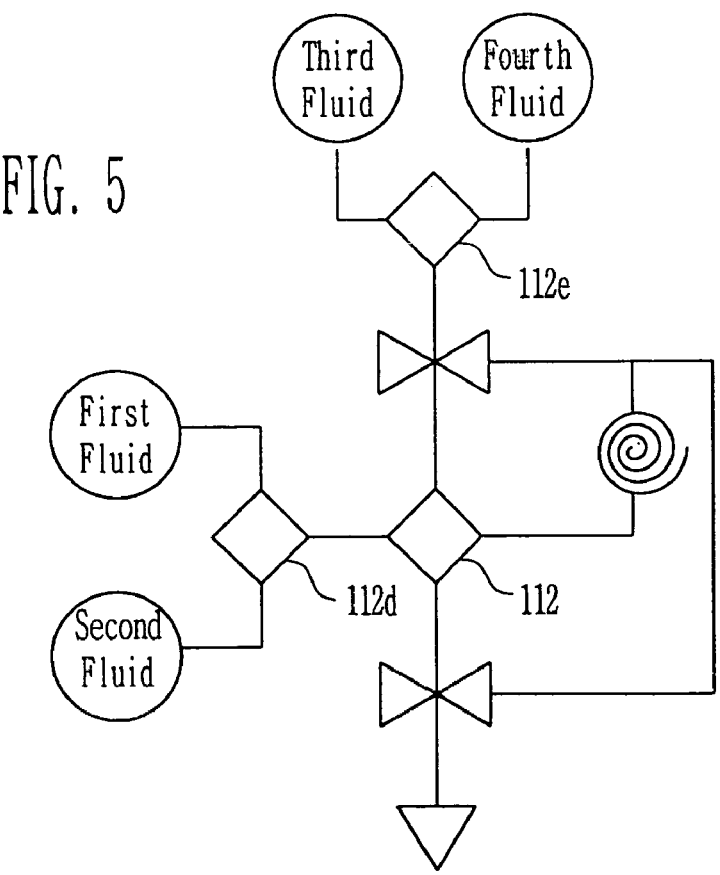
FIG. 5 shows another embodiment of a structure in which a sample preparation reaction chamber is added to a fluid control device using surface tension according to the present invention.

For the present invention to be applied in the bio chip, a filter can be inserted when a sample preparation needs to be performed, or additional sample preparation reaction chamber can be applied when additional reaction needs to be performed in advance. FIG. 5 shows the embodiment in which sample preparation reaction chambers 112d, 112e are added, and the first and second fluids, and the third and fourth fluids are respectively subject to reaction at the sample preparation reaction chambers 112d, 112e in advance and then injected.

As described above, the device for controlling the fluid using surface tension in accordance with the present invention, feeds and stops the small amount of the fluid and adjusts the speed of the fluid only by using the natural flow derived from capillary force, and achieves the complete exchange of fluid solution, thereby additional pump and power supply are not needed and the device can be small sized and portable, and also not only the manufacturing cost is reduced and the production yield is increased but the device can be hardly out of order. Therefore, the device for controlling the fluid using surface tension according to the present invention can be applied to various bio chips including a micro biological/chemical reactor, a drug delivery system, a DNA chip, and a protein chip which need to be controlled in exact and fine way.

Although the present invention has been described in conjunction with the preferred embodiment, the present invention is not limited to the embodiments, and it will be apparent to those skilled in the art that the present invention can be modified in variation within the scope of the invention.

What is claimed is:

1. A device for controlling fluid using surface tension of the fluid, comprising:
    at least one storage chamber to which a fluid is injected and stored;
    at least one reaction chamber in which a predetermined reaction occurs on the fluid;
    at least one supply channel, each supply channel communicating fluid from each storage chamber to the at least one reaction chamber;
    at least one exhaust chamber in which fluid used as a result of the reaction is exhausted;
    at least one exhaust channel, each exhaust channel communicating used fluid from each reaction chamber to the at least one exhaust chamber;
    a first capillary stop valve located in each supply channel between the at least one storage chamber and the at least one reaction chamber;
    a second capillary stop valve located in each exhaust channel between the at least one reaction chamber and the at least one exhaust chamber;
    at least one side connecting channel connecting the first capillary stop valve to the second stop valve, wherein the capillary stop valves stop the flow of the fluid in each supply channel and exhaust channel using the surface tension of the fluid, and wherein a flow of fluid through the side connecting channel opens the capillary stop valves;
    at least one flow delay part formed within said side connecting channel and delays flow of the fluid by the surface tension of the fluid; and
    wherein said fluid moves from said storage chamber to said reaction chamber and exhaust chamber using only surface tension and the fluid in said reaction chamber is replaced by a different fluid.

2. The device as claimed in claim 1, wherein said at least one storage chamber includes a fluid inlet operable to receive the fluid.

3. The device as claimed in claim 1, wherein said at least one side connecting channel adjusts the surface tension by at least one of increasing a width of the path, decreasing a width of the path, and performing surface modification or temperature change so that the fluid reliably moves.

4. The device as claimed in claim 1, wherein said capillary stop valves adjust the surface tension by at least one of a hydrophilic or hydrophobic property on a channel surface of the valve, deforming the channel geometry, and changing a temperature of the channel surface of the valve.

5. The device as claimed in claim 1, wherein said at least one flow delay part adjusts the surface tension by at least one of a hydrophilic or hydrophobic property on a channel surface of the side connecting channel, deforming the channel geometry, and changing a temperature of the channel surface of the side connecting channel.

6. The device as claimed in claim 1, wherein said at least one exhaust chamber includes a structure that smoothes the flow of the fluid by increasing the surface tension, making a preceding portion of the fluid uniform when the fluid flows, thereby preventing fine air bubbles from occurring.

7. The device as claimed in claim 1, wherein said at least one side connecting channel includes an isolation threshold preventing reactants among a plurality of said reaction chambers from diffusing.

8. The device as claimed in claim 1, wherein said at least one reaction chamber comprises at least one electrode on a wall of the reaction chamber, the electrode configured for optical and electrochemical detection.

9. A device for controlling fluid using surface tension of the fluid, comprising:
    at least two devices according to claim 1 connected in series.

10. A device for controlling fluid using surface tension of the fluid, comprising:
    at least two devices according to claim 1 connected in parallel.

11. The device of claim 1, further comprising a filter.

12. The device of claim 1, further comprising at least one sample preparation chamber.

13. The device of claim 1, further comprising at least one air vent.

14. A drug delivery device comprising the device of claim 1.

15. A biochip comprising the device of claim 1.

16. A micro biological/chemical reactor comprising the device of claim 1.

* * * * *